US009449276B2

(12) United States Patent
Hadar (10) Patent No.: US 9,449,276 B2
(45) Date of Patent: Sep. 20, 2016

(54) GRAPHICAL MODEL-DRIVEN SYSTEM FOR KNOWLEDGE MANAGEMENT TOOLS

(75) Inventor: Ethan Hadar, Nesher (IL)

(73) Assignee: CA, Inc., New York, NY (US)

(*) Notice: Subject to any disclaimer, the term of this patent is extended or adjusted under 35 U.S.C. 154(b) by 1361 days.

(21) Appl. No.: 12/187,921

(22) Filed: Aug. 7, 2008

(65) Prior Publication Data

US 2009/0049000 A1 Feb. 19, 2009

Related U.S. Application Data

(60) Provisional application No. 60/956,042, filed on Aug. 15, 2007.

(51) Int. Cl.
*G06F 17/00* (2006.01)
*G06N 5/02* (2006.01)
*G06N 5/04* (2006.01)
*G06N 5/00* (2006.01)
*G06F 17/30* (2006.01)
*G06K 9/00* (2006.01)

(52) U.S. Cl.
CPC .............. *G06N 5/022* (2013.01); *G06N 5/003* (2013.01); *G06N 5/04* (2013.01); *G06F 17/30247* (2013.01); *G06F 17/30253* (2013.01); *G06K 9/00442* (2013.01)

(58) Field of Classification Search
USPC ........................................................ 706/50
See application file for complete search history.

(56) References Cited

U.S. PATENT DOCUMENTS

| 6,816,090 B2* | 11/2004 | Teckchandani et al. ...... 340/989 |
| 2003/0093322 A1* | 5/2003 | Sciuk ............................... 705/26 |
| 2004/0123234 A1* | 6/2004 | Anderson et al. ............. 715/513 |
| 2004/0133493 A1* | 7/2004 | Ford et al. ........................ 705/35 |
| 2006/0004708 A1* | 1/2006 | Hartmann et al. ............... 707/3 |
| 2006/0020581 A1* | 1/2006 | Dettinger et al. ................ 707/3 |
| 2006/0026078 A1* | 2/2006 | King et al. ....................... 705/26 |
| 2007/0192085 A1* | 8/2007 | Roulland et al. ................. 704/9 |
| 2007/0240050 A1* | 10/2007 | Quinn-Jacobs ............... 715/700 |

OTHER PUBLICATIONS

Houser, Chris and Patricia Thornton. "Poodle: A course-management system for mobile phones" Proceedings fo the 2005 IEEE International Workshop on Wireless and Mobile Technologies in Education. 2005. [Online] Downloaded Apr. 13, 2011. http://ieeexplore.ieee.org/stamp/stamp.jsp?tp=&arnumber=1579267.*

* cited by examiner

*Primary Examiner* — Ben Rifkin
(74) *Attorney, Agent, or Firm* — Baker Botts L.L.P.

(57) ABSTRACT

According to one embodiment of the disclosure, a graphical model-driven system includes a graphical knowledge pattern system coupled to a modeler interface. The graphical knowledge pattern system has a graphical knowledge pattern library for the storage of a plurality of graphical knowledge patterns that are configured to classify information according to one or more information related criteria. The modeler interface is operable to receive a request for information from the user interface and retrieve information from one or more knowledge based systems according to one or more information related criteria of a particular graphical knowledge pattern.

20 Claims, 5 Drawing Sheets

GRAPHICAL MODEL-DRIVEN SYSTEM FOR KNOWLEDGE MANAGEMENT TOOLS

RELATED APPLICATIONS

This application claims priority to U.S. Provisional Patent Application Ser. No. 60/956,042, entitled "GRAPHICAL MODEL-DRIVEN SYSTEM FOR KNOWLEDGE MANAGEMENT TOOLS," which was filed on Aug. 15, 2007.

TECHNICAL FIELD OF THE DISCLOSURE

This disclosure generally relates to knowledge based systems, and more particularly, to a graphical representation and a collaborative management platform for knowledge based modeling systems that provide contextual information to the user.

BACKGROUND OF THE DISCLOSURE

Knowledge based systems generally refer to computer information systems that provide access to various forms of information. This information may be stored in a single database or federated over a plurality of databases. The Internet is one particular example of a federated database that may include information from a plurality of disparate databases or document management systems. Due to its relatively open and accessible nature, information provided by the Internet may change in scope and form on a periodic basis according to transient desires of users and providers of this information.

SUMMARY OF THE DISCLOSURE

According to one embodiment of the disclosure, a graphical model-driven system includes a graphical knowledge pattern system coupled to a modeler interface. The graphical knowledge pattern system has a graphical knowledge pattern library for the storage of a plurality of graphical knowledge patterns that are configured to classify information according to one or more information related criteria. The modeler interface is operable to receive a request for information from the user interface and retrieve information from one or more knowledge based systems according to one or more information related criteria of a particular graphical knowledge pattern.

Some embodiments of the disclosure provide numerous technical advantages. Some embodiments may benefit from some, none, or all of these advantages. For example, according to one embodiment, the graphical model-driven system may provide a contextual visual interactive interface for access of information from one or more knowledge based systems that is customizable and extensible. The knowledge collaboration, certification, and notification engine may enable decisions and directives on how to filter and/or collaborate information provided from one or more knowledge based systems that may be continually monitored and modified according to the needs or desires of an organization. In this manner, the abstraction model may be operable to adapt to periodic changes in information such that users of the graphical model-driven system have access information that may be relatively pertinent to their endeavor.

Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

As described previously, knowledge based systems, such as the Internet, provide information that may constantly change due to needs of users and providers of the information. In one respect, linguistic norms adhered to by various groups or cultures may cause changes to certain types of information by varying the terminology by which this information is provided. Knowledge based systems, such as search engines or "wiki" websites, provide access to information on a linguistic basis. That is, searching for relevant information is usually enabled using one or more textual search terms. Changes in textual representation of these terms, however, may encumber the user's ability to access relevant information.

Figure 1:
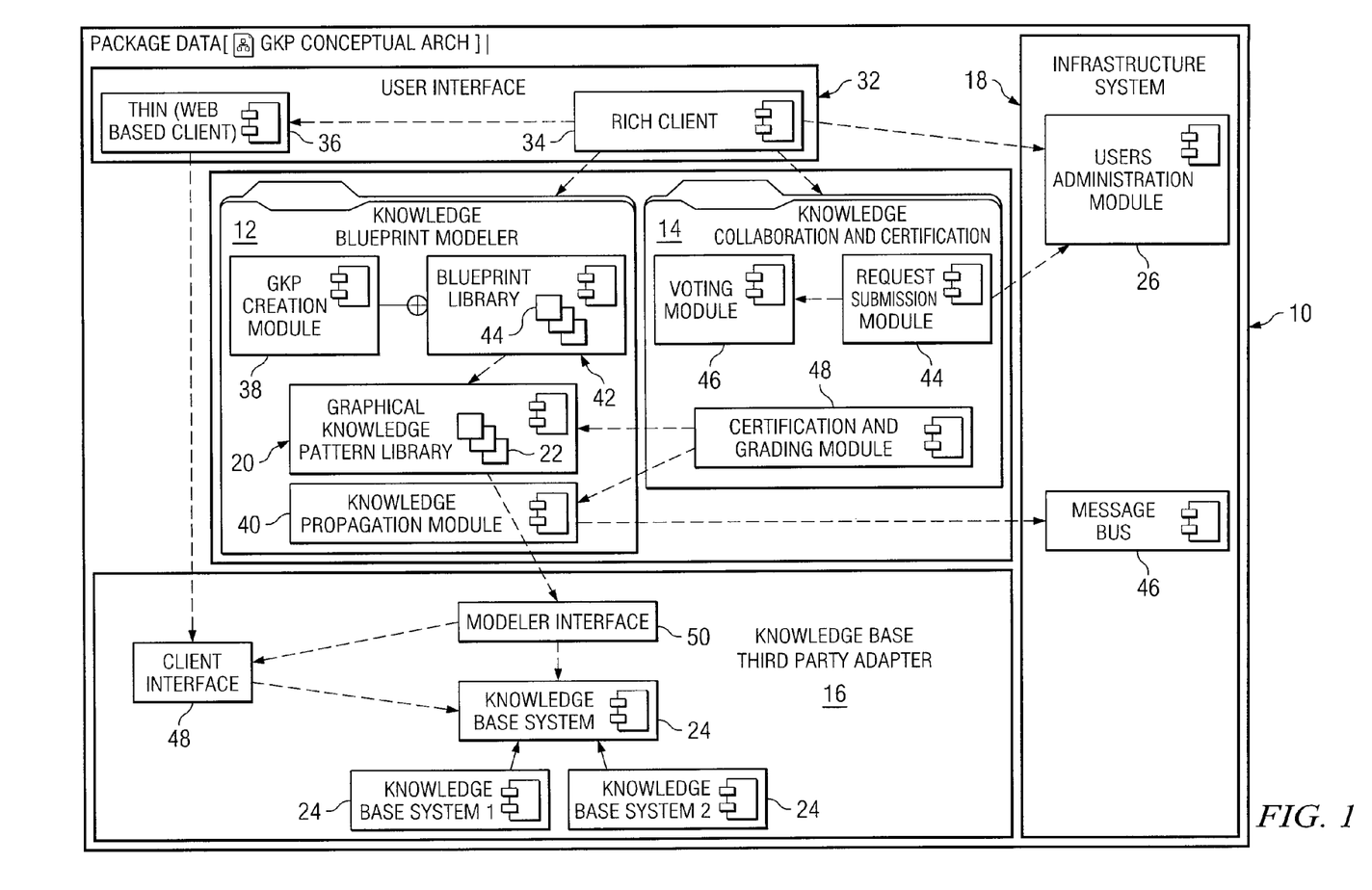
FIG. 1 is a block diagram showing one embodiment of a graphical model-driven system according to the teachings of the present disclosure.

FIG. 1 shows one embodiment of a graphical model-driven information retrieval system 10 that may provide a solution to this problem as well as other problems. Graphical model-driven information retrieval system 10 generally includes a knowledge blueprint modeler 12, a knowledge collaboration, certification, and notification engine 14, a knowledge based third party adapter 16, and an infrastructure system 18 coupled to a user interface 32 as shown. Knowledge blueprint modeler 12 includes a graphical knowledge pattern library 20 storing a plurality of graphical knowledge patterns 22 that are configured to classify information according to one or more information related criteria. According to the teachings of the present disclosure, graphical model-driven information retrieval system 10 retrieves information from one or more knowledge based systems 24 within knowledge based third party adapter 16 according to graphical knowledge patterns 22 stored in graphical knowledge pattern library 20.

Graphical model-driven information retrieval system 10 may be implemented on any suitable computing system that may be, for example, a network coupled computing system or a stand-alone computing system. The stand-alone computing system may be any suitable computing system, such as a personal computer, laptop computer, or mainframe computer capable of executing instructions necessary to implement the graphical model-driven information retrieval system 10 according to the teachings of the present disclosure. The network computing system may be a plurality of computers coupled together via a network, such as a local area network (LAN), a metropolitan area network (MAN), or a wide area network (WAN). The graphical model-driven information retrieval system 10 implemented on a network computing system may allow several users, such as skilled users of the graphical model-driven information retrieval system 10 to readily share results with other users of the graphical model-driven information retrieval system 10.

User interface 32 is implemented with a rich client 34 for accessing the various features of the knowledge blueprint modeler 12 and a thin client 36 for direct access of relevant information from knowledge base third party adapter 16. In one embodiment, multiple rich clients 34 and/or multiple thin clients 36 may be simultaneously accessible from the user interface 32 such that the user may access numerous results from each of the multiple rich clients 34 and/or thin clients 36. In another embodiment, one or more externally driven tools such as described below may be configured with the multiple rich clients 34 and/or thin clients 36 for aggregation of information to a user in a relatively efficient manner.

Infrastructure system 18 includes an administration module 26 and a message bus 46. Administration module 26 may be provided to modify one or more graphical knowledge patterns 22 for each individual user based on a user privilege of the individual user. That is, graphical model-driven information retrieval system 10 may provide unique access rights to each user based on one or more specific user privileges assigned to that user.

Knowledge blueprint modeler 12 includes a creation module 38, graphical knowledge pattern library 20, a knowledge propagation module 40, and a blueprint library 42. The creation module 38 may create one or more graphical knowledge patterns 22 and store these graphical knowledge patterns in graphical knowledge pattern library 20. Blueprint library 42 stores one or more blueprints 44. Each blueprint 44 maintains a list of users and their particular type of notification mechanism. Information modeled in each blueprint 44 may have a contextual meaning according to the organization's needs. Any particular blueprint 44 may be associated with one or more graphical knowledge patterns 22. As will be described below, a change to an associated graphical knowledge pattern 22 may trigger its associated blueprint 44 to provide passive or active notification to a user associated with the blueprint 44. Details of knowledge collaboration, certification, and notification engine 14 and its associated elements are described in detail below.

Knowledge base third party adapter 16 includes a client interface 48, a modeler interface 50, and one or more knowledge based systems 24 that are coupled as shown. Modeler interface 50 and client interface 48 receive requests for information from user interface 32 and transmit information back to user interface 32 according to those requests. Knowledge base system 24 may include any type of information repository, such as, for example, a database that stores information, the Internet, or a search engine that aids in retrieval of information from the Internet.

Figure 2:
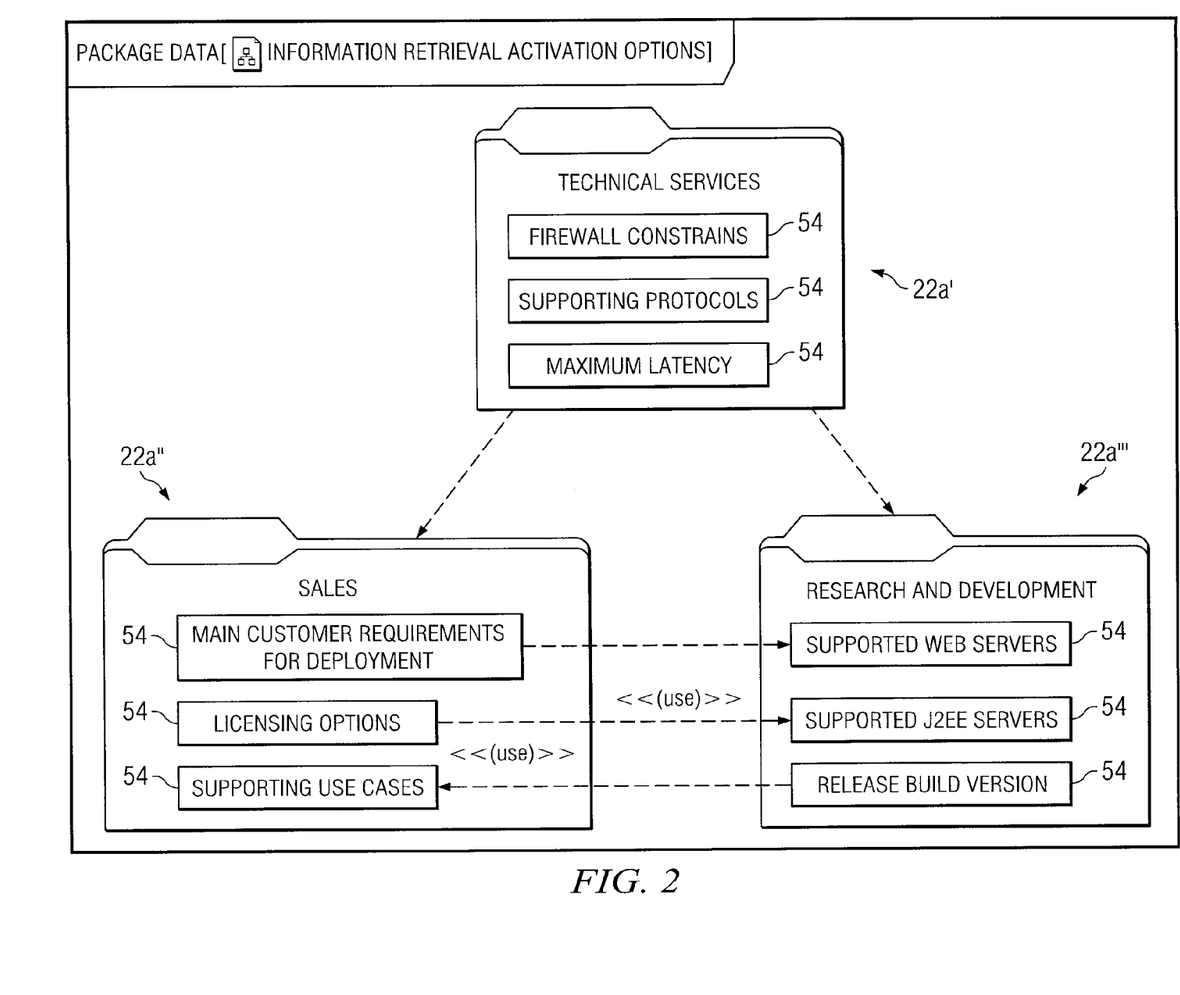
FIG. 2 is a block diagram of several example graphical knowledge patterns that may be used with the graphical model-driven system of FIG. 1.

FIG. 2 shows several example graphical knowledge patterns 22 that may provide navigational structured knowledge of information. In this particular example, a technical services graphical knowledge pattern 22a' may be associated with a sales graphical knowledge pattern 22a" and a research and development graphical knowledge pattern 22a'''. The technical services graphical knowledge pattern 22a' includes a plurality of criteria 54 that enable modeling of information provided by the technical services graphical knowledge pattern 22a'. Likewise the sales graphical knowledge pattern 22a" and research and development graphical knowledge pattern 22a''' each have a plurality of criteria 54 for modeling information. In use, retrieval of information using the sales graphical knowledge pattern 22a" may enable contextual retrieval of relevant information from research and development graphical knowledge pattern 22a''' using associations formed through technical services graphical knowledge pattern 22a. Likewise, retrieval of information using the research and development graphical knowledge pattern 22a" may enable contextual retrieval of relevant information from sales graphical knowledge pattern 22a''' using associations formed through technical services graphical knowledge pattern 22a.

Figure 3A:
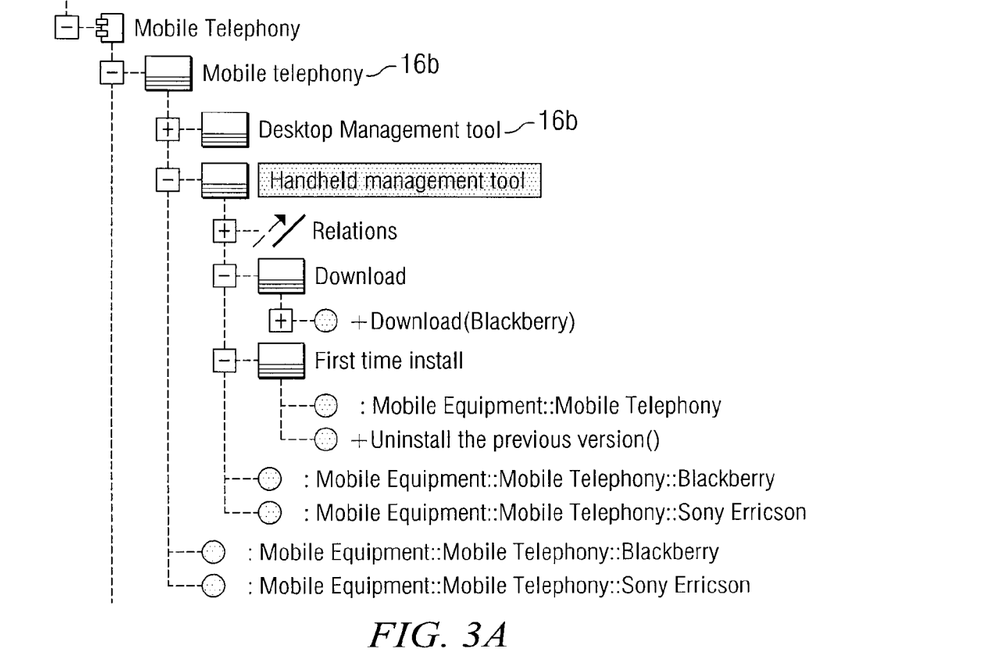
FIG. 3A is textual view of several example graphical knowledge patterns that may be used with the graphical model-driven system of FIG. 1.
Figure 3B:
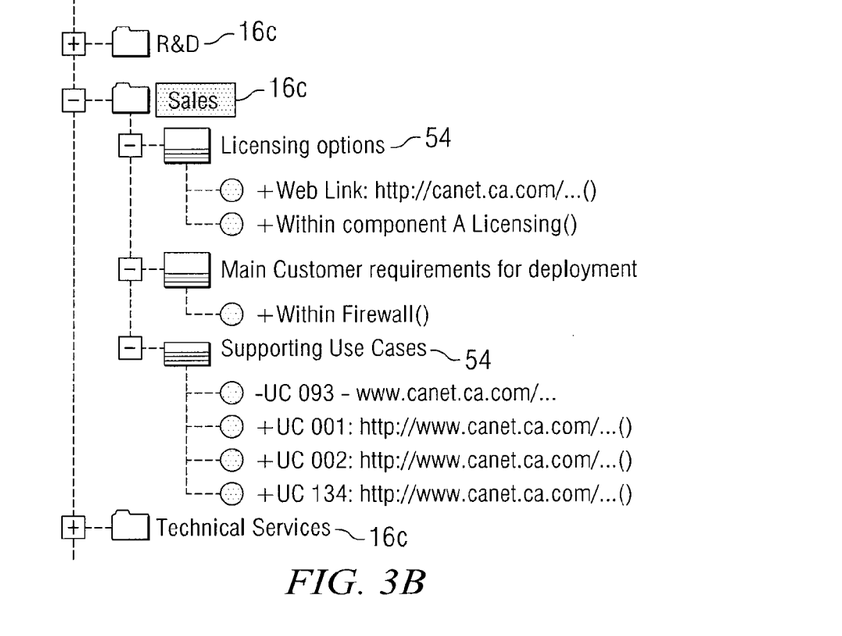
FIG. 3B is a textual view of several example graphical knowledge patterns that may be used with the graphical model-driven system of FIG. 1.

FIGS. 3A and 3B each show several embodiments of a plurality of graphical knowledge patterns 22b and 22c with associated criteria 54 that may be stored in graphical knowledge pattern library 20. As shown, various graphical knowledge patterns 22b may be contextually associated with one another in a hierarchal fashion. Each of the various graphical knowledge patterns 22b may be contextually associated in any suitable contextual domain. In one embodiment, graphical knowledge patterns 22b stored in graphical knowledge pattern library 20 may include certification indications as described below.

Each graphical knowledge pattern 22b or 16c generally includes a model of particular criteria associated with information in graphical model-driven information retrieval system 10. In one embodiment, user interface 32 may provide access to these graphical knowledge patterns 22b or 22c using a graphical approach as described below. By graphically selecting a modeled element, the user can define the inner properties of the element, as well as link it to other models. The inner properties may contain the relevant predefined queries. Graphical knowledge patterns 22b and 22c may be maintained within any suitable persistency system. In one embodiment, graphical knowledge patterns 22b and 22c may include version control. In another embodiment, graphical knowledge patterns 22b and 22c may be persistently stored using a "publish-subscribe" type model.

Figure 4:
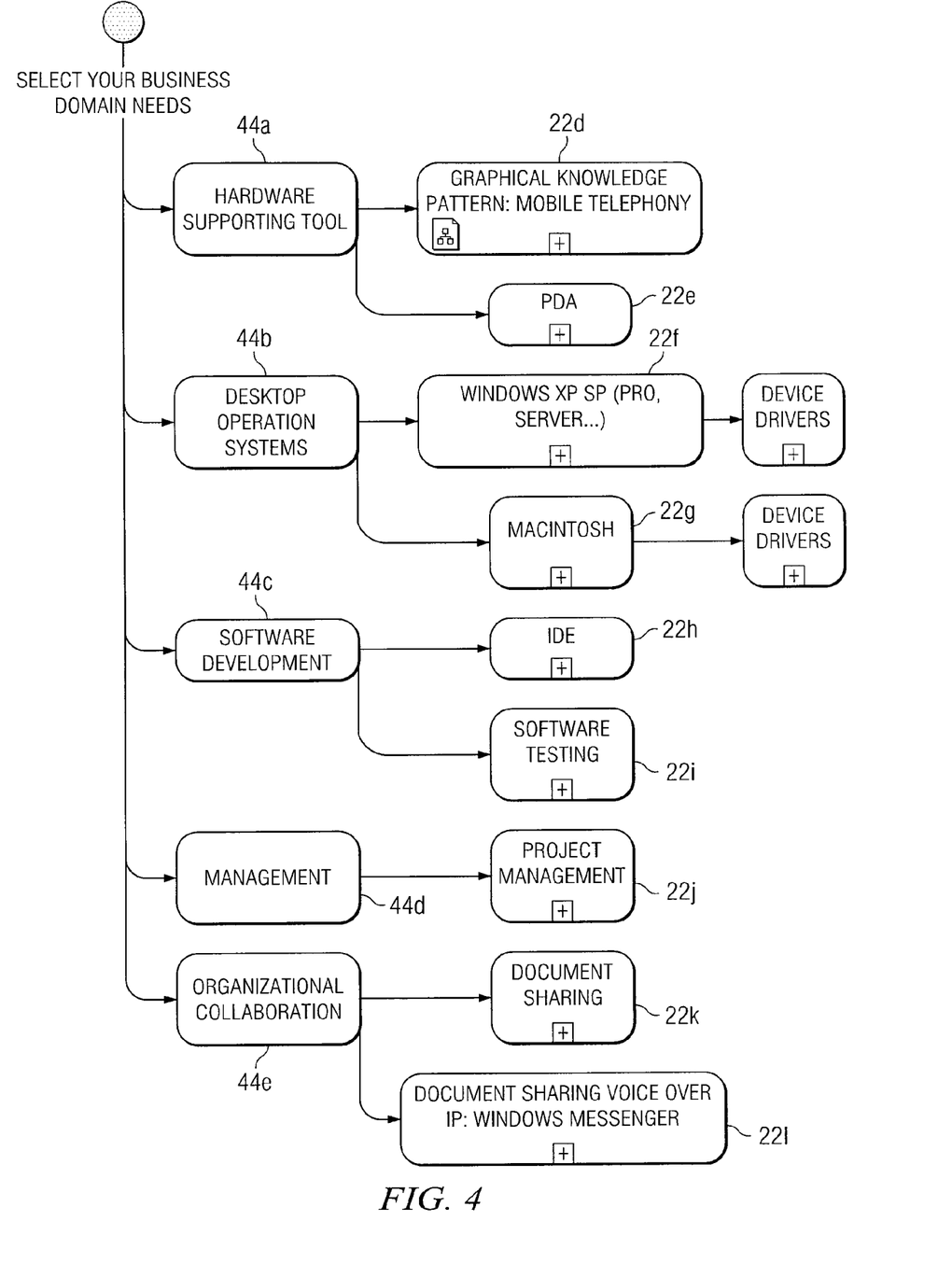
FIG. 4 is a block diagram showing several example graphical knowledge patterns that may be associated with several blueprints of the graphical model-driven system of FIG. 1.

FIG. 4 shows examples of several blueprints 44 that may be associated with one or more graphical knowledge patterns 22. In this particular example, a hardware supporting tool blueprint 44a may be associated with a mobile telephony graphical knowledge pattern 22d and a personal digital assistant (PDA) graphical knowledge pattern 22e. Requests from users for information relating to hardware supporting tools may cause the graphical model-driven information retrieval system 10 to link information modeled in either or both graphical knowledge patterns 22d or 22e based upon specific user requested information or other information provided in its associated blueprint 44a. Desktop operation system blueprint 44b may be associated with a windows graphical knowledge pattern 22f and a Macintosh graphical knowledge pattern 22g. Access to information modeled in graphical knowledge patterns 22f and 22g may be provided by desktop operation system blueprint 44b in a similar manner to hardware supporting tool blueprint 44a.

As another example, software development blueprint 44c may be associated with an integrated desktop environment (IDE) graphical knowledge pattern 22h and a software testing graphical knowledge pattern 22i. Using the software development blueprint 44c, users may be able to access information modeled in graphical knowledge patterns 22h and 22i. For example, a particular request for information from a user may be related to software development. If the user has proper access privileges to the software development blueprint 44c, the graphical model-driven information retrieval system 10 may access the integrated desktop environment (IDE) graphical knowledge pattern 22h and/or software testing graphical knowledge pattern 22i based upon the context of the user requests or other information included in the software development blueprint 44c.

Management blueprint 44d and organizational collaboration blueprint 44e may be associated with a project management graphical knowledge pattern 22j and document sharing graphical knowledge pattern 22k and document sharing voice over IP (VOIP) graphical knowledge pattern 22l respectively in order to provide selective information to the user in a similar manner as described above.

The previously described example blueprint 44/graphical knowledge pattern 22 associations provide several examples of accessing information from one or more graphical knowledge patterns 22 using the graphical model-driven information retrieval system 10. It should be appreciated, however, that any type and plurality or blueprints 44 may be created and associated with any type and plurality of graphical knowledge patterns 22 for access of modeled information.

Information may be modeled in the graphical model-driven information retrieval system 10 according to any suitable modeling entity. In one embodiment, information may be modeled according to a unified modeling language (UML) entity or a systems modeling language (SysML) modeling entity. The properties of each modeling entity may be either defined within the model, such as embedded information in a unified modeling language fashion or linked to external (federated) information source, whether by pure reference linking or by activating a predefined command query on a search engine. A user can define a domain specific ontology on top of these modeling approaches, by providing extensions to unified modeling language or systems modeling language profiles. In one embodiment, modeling entities may have a plurality of properties that may include inner entities (unified modeling language aggregation approach). In this particular case, several dynamically constructed knowledge retrieval queries may be associated for each inner property.

Each query retrieval mechanism is constructed separately, and may access well defined information from the knowledge based third party adapter 16. The queries can access any known repository system, as well as automatically activate thin client 36 for retrieval of associated information. The activation of the queries may be performed by visually selecting the properties of the one or more graphical knowledge patterns 22 in graphical form, and selecting the predefined queries. The selection can be for a single graphical pattern, or for several at once. Certain embodiments may provide an advantage in that more than one type of information may be simultaneously retrieved from several knowledge based systems 24. Each query may retrieve various types of information, such as, for example, links to the detailed information within the original knowledge base systems, meta-data of the requested knowledge, keywords of the requested knowledge, an abstract definition of the knowledge, an aggregated form of the knowledge, and a grading and certification information that describe the integrity of the data based on the domain experts opinion.

Graphical knowledge pattern library 20 may be included to enable organization and access of graphical knowledge patterns 22 used by the graphical model-driven information retrieval system 10. Graphical knowledge pattern library 20 is formed from a tree view selection of categorization and elements list. Graphical knowledge patterns 22 may be aggregated according to contextual domain relevancy. A contextual domain example of software architecture deployment can be the categorization of components, coupled components, nodes, and servers. In the event of a change in the underlying information of a model, such as the addition of query using creation module 38, a notification or indication alert may be sent to knowledge propagation module 40 for delivery to each of the various users. When a particular graphical knowledge pattern 22 changes, i.e., adding or removing of a modeled entity, a new version of the graphical knowledge pattern 22 is created, and a message of different severity is being sent to the users.

Blueprints 44 may be used to associate patterns, and select relevant notification options of the various graphical knowledge patterns 22. In one embodiment, the various blueprints 44 may provide contextual aggregations of reusable graphical knowledge patterns 22. When a user is constructing a context such as software architecture deployment graphical knowledge pattern, or self support service problem resolution, the various graphical knowledge patterns may be assembled and linked together using these blueprints 44.

In one embodiment, the blueprints 44 and associated graphical knowledge patterns 22 may be accessed outside the domain of the graphical model-driven information retrieval system 10. That is, blueprints 44 and their associated graphical knowledge patterns 22 may be accessed using externally driven tools other than the graphical model-driven information retrieval system 10 in order to provide an information bundle to the user. An information bundle may include any information that is filtered from one or more knowledge based systems 24. Once generated, the blueprints 44 and associated graphical knowledge patterns 22 may be stored in a database for use by these externally driven tools while executed on a suitable computing system.

Users of the graphical model-driven information retrieval system 10 may be either registered or transient. Registered users may receive notifications due to changes, and transient users may consume the knowledge provided by model-driven information retrieval system 10 temporarily. Each graphical knowledge pattern 22 maintains a list of registered users that may be controlled using a version control tool. When a graphical knowledge pattern 22 is modified, knowledge collaboration, certification, and notification engine 14 alerts users of the change. A relational model may be used to link various blueprints 44 to the various users. Each blueprint 44 maintains a list of registered users and their type of service. When composing a blueprint 44, the users select blueprints 44 according to contextual categorizations. The registration information is kept within the context of the blueprint 44, according to what blueprint it is associated with. The blueprint 44 may maintain a list of users and their specific type of notification mechanism.

The knowledge propagation module 40 may be operable to propagate changes to graphical knowledge patterns 22 to the end-users via blueprints 44. For each selection of a blueprint 44, the users can define the type of alert they would like to receive, which may include, no indication, indication, or notification. The indication alerts will change the symbolic icon on the relevant blueprint 44. The notification alert will generate the indication alert, as well as send a message to users associated with that particular blueprint 44. Knowledge collaboration, certification, and notification engine 14 may provide a transient configuration of active automatic notifications that are sent to the user immediately after a change was approved by the expert user. According to the users' registration to such a service, an alert is initiated for the chosen graphical knowledge pattern 22 to the containing contextual blueprints 44. According to these blueprints 44, a notification may be sent to the user. In one embodiment, the user may periodically refresh their will to receive such a notification, in the form of a watch-dog type design pattern.

Referring again to FIG. 1, the knowledge collaboration, certification, and notification engine 14 may include a request submission module 44, a voting module 46, and a certification and grading module 48. In one aspect, the knowledge collaboration, certification, and notification engine 14 may be operable to reduce the amount of information that is provided to the user while increasing it validity, within a context of one or more graphical knowledge patterns 22. Expert users may certify in terms of its relevancy, importance and other criteria the of the one or more graphical knowledge patterns 22. An example from an architectural contextual domain can be whether a feature was approved or not by a customer.

The request submission module 44 operates in a "service desk" type manner in which one or more users may submit a change request, as well as additional commentary, and customized fields, to an appropriate expert user who constructed the graphical knowledge pattern 22. Using the request submission module 44, collaboration changes may be triggered. In one embodiment, the request submission module 44 may be a known service center that processes change requests from various users and collaborates with expert users to implement these changes. Change requests may be initiated when one or more graphical knowledge patterns 22 may be added, changed, removed, or eliminated. For example, a graphical knowledge pattern 22 may be added, such as by adding an information source with initial certification grading. As another example, a graphical knowledge pattern 22 may be changed by modifying a query to extract more information from the same knowledge based system 24. A graphical knowledge pattern 22 may be removed by when information is no longer relevant to a particular graphical knowledge pattern 22. In one embodiment, the request submission module 44 may facilitate a community effort to improve the integrity of the information by specific collaboration and certification tools adapted for this task.

Voting module 46 is provided to allow the predefined user experts to cast their vote on a requested change. The changes are periodically evaluated and resolved by a focus group leader. This means that the data cleansing and reduction of information load on the organization may be performed by a team of expert users. The voting module 46 may hold an incentive mechanism that encourages the submission of changes by voting. That is, the expert users may be operable to receive an incentive as defined by the organization. This may encourage contribution to the company commitments to increase data integrity.

Certification and grading module 48 may be implemented to resolve decisions and other relevant information, such as date of change, reason for change, and submitting the change. In one embodiment, the expert users may be able to add self-observation and commentary to each change.

The graphical model-driven information retrieval system 10 includes a model driven knowledge tool that applies a modeling and interaction methodology comprised of knowledge representation, knowledge propagation, and knowledge reuse. As will be described in detail below according to one embodiment, the graphical model-driven information retrieval system 10 may represent information using a visual interactive model that is customizable and extensible, propagate knowledge modification by active indications and notifications of contextual change, collaborate between domain experts by increasing knowledge relevancy and access speed, collaboratively certify and grade active knowledge by reducing the amount of obsolete knowledge, and/or increase knowledge reuse by modeling graphical knowledge patterns that are re-assembled using a meta-library of patterns and graphical knowledge patterns 22.

In one embodiment, the graphical model-driven information retrieval system 10 may proactively collaborate and certify information from one or more knowledge based systems 24 by enabling knowledge propagation and certification via automation tools, as well as using knowledge graphical modeling interfaces as an interaction mechanism for knowledge access. The graphical model-driven information retrieval system 10 may eliminate redundant information within knowledge base systems 42 by using a group collaborative methodology that is based on domain expert users that periodically vote on the integrity of the data, and its relevance. Various users of graphical model-driven information retrieval system 10 may each submit change requests to the modeled knowledge as a base for the experts voting procedure. Consequently, the trust of the knowledge consumers may be increased when accessing specific information from knowledge based systems 24.

In one embodiment, the graphical model-driven information retrieval system 10 may model information from different types of knowledge based systems 24. Users searching for relevant information within their specific graphical domain specific language (DSL) can be represented by any symbol or iconic figure (component, entity, category and so on), or any type of conceptual link (aggregation, generalization, usage, and so on) The relevant information modeled within the graphical model-driven information retrieval system 10 may have a contextual meaning that is stored persistently in the one or more graphical knowledge patterns 22. For each element in a particular graphical knowledge pattern 22, there might be one or more associated ready-made queries (Model Driven Knowledge) that retrieves information. That information can be embedded within the particular graphical knowledge pattern 22, or can be referred to another location. Any change to any aspect of related information affecting the one or more graphical knowledge patterns 22 may be indicated passively or notified actively to the user, ensuring that the change in the information is propagated to the user.

In one embodiment, the graphical model-driven information retrieval system 10 may provide graphical modeling tools and associated queries as a mean for knowledge interaction by using domain specific language (DSL) tools to generate data access queries, as well as store meta-library of the modeled patterns. In another embodiment, the graphical model-driven information retrieval system 10 may enable users to submit change requests that may enable expert users to update the graphical knowledge patterns 22 on a periodic basis for maintaining the structure or integrity of the knowledge. In another embodiment, the graphical model-driven information retrieval system 10 may enable voting on these change requests that may provide for knowledge cleansing and a corresponding increase in the trust of relevant information. In another embodiment, the graphical model-driven information retrieval system 10 may provide propagation of information by informing users of a change in the graphical knowledge pattern 22 and/or associated information in a proactive (notification) or passive (indication) manner.

Figure 5:
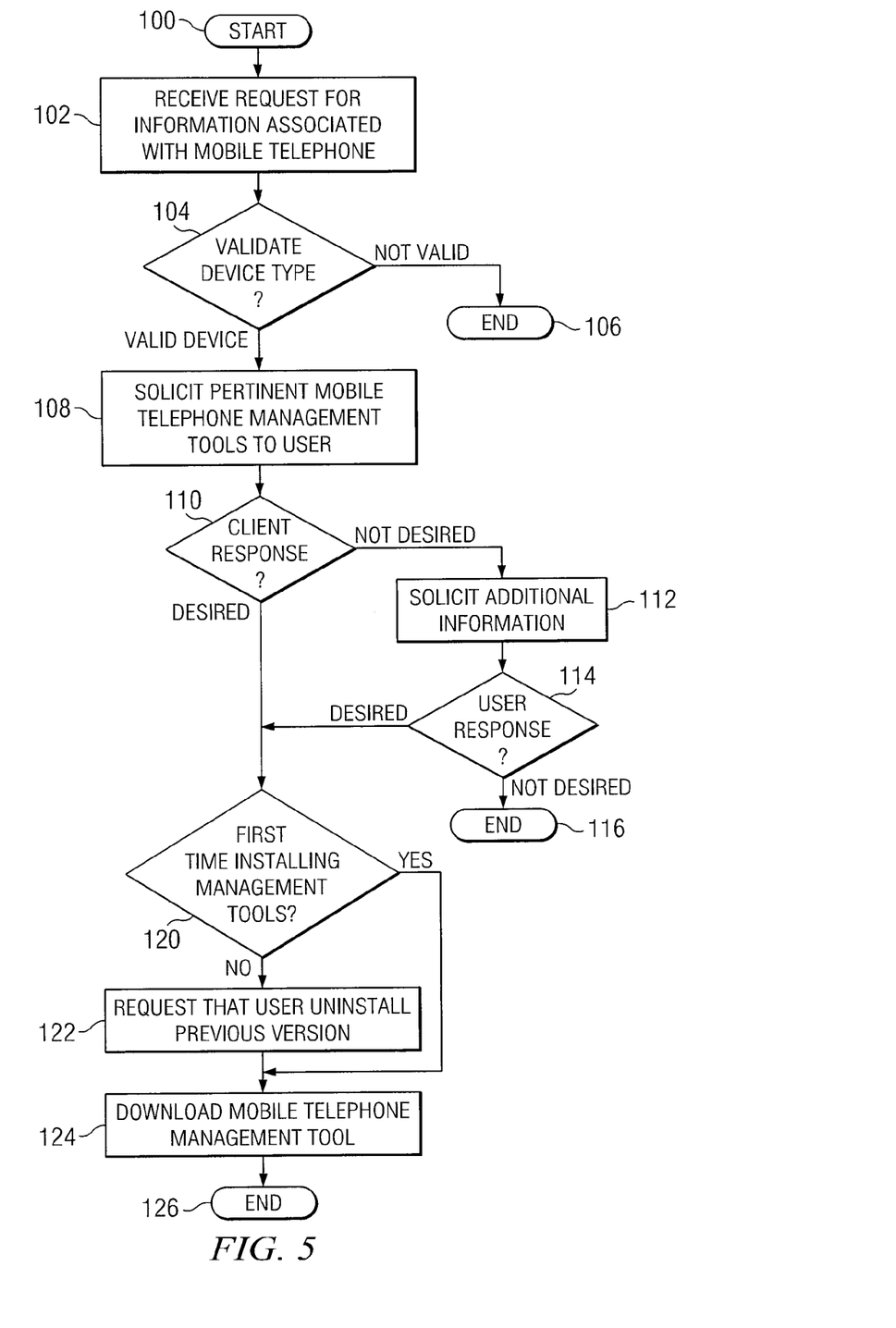
FIG. 5 is one example of a flow diagram that may be implemented by the graphical model-driven system of FIG. 1 to select an appropriate mobile telephone management tool.

FIG. 5 shows a flow diagram of one example implementation of the graphical model-driven information retrieval system 10 according to the teachings of the present disclosure in which a particular user of user interface 32 may be directed to a pertinent type of software based on his or her type of mobile telephone. In this particular example, several blueprints 44 describe a particular software tool that can provide solutions to the user's particular needs without requiring detailed knowledge of each of the software tools from the user. In other examples, blueprints 44 may describe other software tools that may be useful for the user. In act 100, the process is initiated.

In act 102, graphical model-driven information retrieval system 10 receives a request for information associated with a product, which in this example is a mobile telephone. Based upon this request, modeler interface 50 retrieves a suitable graphical knowledge pattern 22 from among a plurality of graphical knowledge patterns 22 stored in graphical knowledge pattern library 20.

In act 104, modeler interface 50 validates the type of mobile telephone associated with the request. For example, modeler interface 10 may validate the type of mobile telephone according to user profile information associated with the user interface 32 from one or more blueprints 44 associated with the identity of user interface 32. If the type of mobile telephone is not validated or no graphical knowledge pattern 22 exists for the particular mobile telephone, processing ends at act 106. Otherwise processing continues at act 108.

In act 108, modeler interface 50 solicits one or more mobile telephone management tools that may be pertinent to the type of mobile telephone. Modeler interface 50 determines, using a particular graphical knowledge pattern 22, that user interface 32 may desire certain mobile telephone management tools according to criteria stored in graphical knowledge pattern 22 and/or identity information stored in blueprints 44 associated with the particular graphical knowledge pattern 22.

In act 110, user interface 32 responds either by requesting mobile telephone management tools in act 120 or by rejecting the solicitation in which processing continues at act 112.

In act 112, modeler interface 50 provides additional information about mobile telephone management tools according to the identity of user interface 32 and/or the type of mobile telephone validated in act 104. For example, modeler interface 50 may determine, using the particular graphical knowledge pattern 22 and associated blueprint 44 that a certain management tool may be particularly useful to the user. Thus, additional information is provided to suggest use of the particular mobile telephone management tool. If user interface 32 rejects the additional solicitation, the process ends at act 116. If user interface 32, however, requests the mobile telephone management tool, processing continues at act 120.

In act 120, modeler interface 50 determines whether mobile telephone management tools have been previously installed by the user. In one embodiment, modeler interface 50 makes the determination according to identity information about the user stored in blueprint 44 and if no pertinent information is found, a request may be transmitted to user interface 32. If modeler interface 50 determines that a mobile telephone management tool has been previously installed, processing continues at act 122, otherwise processing continues at act 124.

In act 122, modeler interface 50 transmits a request to user interface 32 that instructs the user to uninstall the previous mobile telephone management tool. Once the previously installed mobile telephone management tool is uninstalled, user interface 32 is then directed to download an appropriate mobile telephone management tool from a knowledge based system 24 in act 124.

In act 126, the process ends.

The previously described process provides one particular example of how graphical model-driven information retrieval system 10 may be used to provide information from one or more knowledge based systems 24 to a user interface 32. Certain embodiments may provide information retrieval of information that is relatively more pertinent to the desires or needs of a user than using known information retrieval systems.

The process, according to interaction with the user, may display available software pertinent to the user needs. Using the graphical model-driven information retrieval system 10, the user can graphically select what to install, according to predefined options. As shown, the user may be gradually and graphically directed how and why to select a specific software tool. The graphical model-driven information retrieval system 10 presents to the user, in a model like approach, what to select and why. It may provide contextual knowledge on the available software tools, such as minimal presentation of relevant features, and how the selected software tools may meet the user's needs and let the user, interactively select a particular software tool. In one embodiment, expert users could construct an appropriate software availability graphical knowledge pattern 22 and associated blueprints 44. Moreover, the expert users may periodically align the graphical knowledge pattern 22 to changing needs of users. Logging of the actual installations provided by the graphical model-driven information retrieval system 10 may enable further improvement using statistical consumption trends.

All relevant graphical knowledge patterns 22 may be mapped to each user within his specific domain for presentation of available contextual software solutions. In one embodiment, other software tools may be displayed without the ability to automatically download the software. The graphical model-driven information retrieval system 10 may gather all the required options, and generate the "requested software to add" options, later on triggering remote delivery.

Based on statistical analysis of actual usage of these graphical knowledge patterns 22 within the business context, the system can proactively recommend software delivery to register users. According to their selected contextual groups of graphical knowledge patterns 22, users may be informed of new, commonly used, and potential business value of various features, and the like. In one embodiment, specific contextual graphical knowledge patterns 22 may be tailored to different businesses, different domains, and different tools.

Other implementations of the graphical model-driven information retrieval system 10 are contemplated. For example, the graphical model-driven information retrieval system 10 may be implemented to enable pre-sales organizational units. Within the contextual domain of solution architecture, the architecture blueprints are used to model components and deployments features. The model will display information that is relevant to service organization such as troubleshooting, required constrains, limitations on the architecture and so on. As another example, the graphical model-driven information retrieval system 10 may be implemented as an incident resolving modeler. Within the contextual domain of service desk and incident management, self-support and incident resolving instructions may use troubleshooting blueprints 44. These blueprints 44 may link graphical knowledge patterns 22 to categorize and identify actions and required knowledge to resolve an incident. In one embodiment, users may be enabled to investigate a pre-configured workflow of knowledge on how to resolve an incident. It can lead service desk employees to follow a recommendation on how to solve a complex problem and collaborate on the best option on how to define a solution. Utilizing the certification and rating module 48 of the graphical model-driven information retrieval system 10, it can improve the level of support and assist in incident support, while evolving and changing.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A graphical model-driven information system comprising:
    a blueprint library operable to store a plurality of blueprints that are each associated with a plurality of users and a particular type of notification for each of the plurality of users, each blueprint linking together two or more graphical knowledge patterns that are related to one another based on one or more criteria;
    a graphical knowledge pattern library operable to store the two or more graphical knowledge patterns, each graphical knowledge pattern comprising a predefined query that is configured to retrieve information related to the one or more criteria;
    a knowledge collaboration and certification engine configured to provide notifications to each of the plurality of users associated with a particular blueprint when one of the two or more graphical knowledge patterns linked by the particular blueprint is modified by at least one of adding, removing, or modifying a predefined query, the modification causing the graphical knowledge pattern to retrieve at least one of different information and information from a different source, and the notification being selected according to the particular type of notification that the particular blueprint associates with each of the plurality of users; and
    a modeler interface coupled to the graphical knowledge pattern and a user interface, the modeler interface operable to:
        receive a request for information from the user interface;
        select a particular graphical knowledge pattern according to the one or more criteria;
        retrieve the information from one or more knowledge based systems according to the particular graphical knowledge pattern; and
        transmit the retrieved information to the user interface.

2. The graphical model-driven information system of claim 1, wherein the knowledge collaboration and certification engine is further operable to receive a change request to the one of the two or more graphical knowledge patterns linked by the particular blueprint, provide the change request to at least one expert user of the knowledge based system, receive at least one modified change request from a corresponding each of the at least one expert users, and modify the one of the two or more graphical knowledge patterns linked by the particular blueprint based on the modified change request.

3. The graphical model-driven information system of claim 1, wherein the modeler interface is operable to select a particular graphical knowledge pattern according to an identity of the user interface.

4. The graphical model-driven system of claim 1, wherein the modeler interface is operable to filter the retrieved information according to a user privilege of the user interface.

5. The graphical model-driven information system of claim 1, wherein the plurality of graphical knowledge patterns are structured according to a modeling entity selected from the group consisting of a unified modeling language and a systems modeling language.

6. The graphical model-driven information system of claim 1, wherein the modeler interface is provided as a third party adapter.

7. The graphical model-driven information system of claim 1, wherein:
    each plurality of blueprints is configured to provide a workflow that navigates a user from one of the linked graphical knowledge patterns to another to complete a task; and
    the predefined query of each graphical knowledge pattern is configured to retrieve information based on information about the user included in an associated blueprint.

8. A method for modifying graphical knowledge patterns in a knowledge based system comprising:
    associating a blueprint with a plurality of users and a particular type of notification for each of the plurality of users, the blueprint linking together a plurality of graphical knowledge patterns that are related to one another based on one or more criteria;
    modifying a particular graphical knowledge pattern from among the plurality of graphical knowledge patterns, each of the plurality of graphical knowledge patterns comprising a predefined query configured to retrieve information related to the one or more criteria;
    providing a notification to each of the plurality of users that is associated with the blueprint when the particular graphical knowledge pattern is modified, the notification being selected according to the particular type of notification that the blueprint associates with each of the plurality of users,
    wherein modifying the particular graphical knowledge pattern includes at least one of adding, removing, or modifying a predefined query, the modification causing the graphical knowledge pattern to retrieve at least one of different information and information from a different source.

9. The method of claim 8, further comprising receiving a change request to the particular graphical knowledge pattern, providing the change request to at least one expert user of the knowledge based system, receiving at least one modified change request from a corresponding each of the at least one expert users, and modifying the particular graphical knowledge pattern based on the modified change request.

10. The method of claim 8, further comprising selecting the particular graphical knowledge pattern according to an identity of the user interface.

11. The method of claim 8, further comprising filtering the retrieved information according to a user privilege of the user interface.

12. The method of claim 8, further comprising structuring each of the plurality of graphical knowledge patterns according to a modeling entity selected from the group consisting of a unified modeling language and a systems modeling language.

13. The method of claim 8, wherein:
- each plurality of blueprints is configured to provide a workflow that navigates a user from one of the linked graphical knowledge patterns to another to complete a task;
- the predefined query of each graphical knowledge pattern is configured to retrieve information based on information about the user included in an associated blueprint; and
- the method further comprises navigating the user from one of the linked graphical knowledge patterns to another based on the information about the user included in the associated blueprint.

14. Code embodied on a non-transitory computer-readable medium, when executed by a processor, operable to perform at least the following:
- associate a blueprint with a plurality of users and a particular type of notification for each of the plurality of users, the blueprint linking together a plurality of graphical knowledge patterns that are related to one another based on one or more criteria;
- modify a particular graphical knowledge pattern from among the plurality of graphical knowledge patterns, each of the plurality of graphical knowledge patterns comprising a predefined query configured to retrieve information related to the one or more criteria;
- provide a notification to each of the plurality of users that is associated with the blueprint when the particular graphical knowledge pattern is modified, the notification being selected according to the particular type of notification that the blueprint associates with each of the plurality of users,
- wherein modifying the particular graphical knowledge pattern includes at least one of adding, removing, or modifying a predefined query, the modification causing the graphical knowledge pattern to retrieve at least one of different information and information from a different source.

15. The code of claim 14, further operable to receive a change request to the particular graphical knowledge pattern, provide the change request to at least one expert user of the knowledge based system, receive at least one modified change request from a corresponding each of the at least one expert users, and modify the particular graphical knowledge pattern based on the modified change request.

16. The code of claim 14, further operable to select the particular graphical knowledge pattern according to an identity of the user interface.

17. The code of claim 14, further operable to filter the retrieved information according to a user privilege of the user interface.

18. The code of claim 14, further operable to structure each of the plurality of graphical knowledge patterns according to a modeling entity selected from the group consisting of a unified modeling language and a systems modeling language.

19. The graphical model-driven information system of claim 1, further comprising a voting module operable to provide a plurality of predefined user experts the ability to cast votes on requested changes to the graphical knowledge patterns.

20. The code of claim 14, wherein:
- each plurality of blueprints is configured to provide a workflow that navigates a user from one of the linked graphical knowledge patterns to another to complete a task;
- the predefined query of each graphical knowledge pattern is configured to retrieve information based on information about the user included in an associated blueprint; and
- the code is further operable to navigate the user from one of the linked graphical knowledge patterns to another based on information about the user included in the associated blueprint.

* * * * *